US00RE41991E

(19) United States
(12) Reissued Patent
Cross

(10) Patent Number: US RE41,991 E
(45) Date of Reissued Patent: Dec. 7, 2010

(54) SYSTEM AND METHOD FOR MANAGING AND COMMUNICATING STATE CHANGES OF A COMPLEX SYSTEM

(76) Inventor: Joseph K. Cross, 901 N. Pollard St., #512, Arlington, VA (US) 22203

(21) Appl. No.: 11/640,542
(22) Filed: Dec. 14, 2006

Related U.S. Patent Documents

Reissue of:
(64) Patent No.: 6,832,346
Issued: Dec. 14, 2004
Appl. No.: 09/834,393
Filed: Apr. 13, 2001

(51) Int. Cl.
*G06F 11/00* (2006.01)

(52) U.S. Cl. ..... 714/49; 714/21; 709/224; 709/221; 713/100

(58) Field of Classification Search ..... 714/49, 714/21
See application file for complete search history.

(56) References Cited

U.S. PATENT DOCUMENTS 5,729,765 A * 3/1998 Cheng ..... 710/53
5,870,561 A * 2/1999 Jarvis et al. ..... 709/238
6,088,816 A * 7/2000 Nouri et al. ..... 714/31
6,108,699 A * 8/2000 Moiin ..... 709/221
6,134,676 A 10/2000 VanHuben et al.
6,182,249 B1 1/2001 Wookey et al.
6,324,492 B1 * 11/2001 Rowe ..... 703/13
6,446,134 B1 * 9/2002 Nakamura ..... 719/313
6,477,172 B1 * 11/2002 Burger et al. ..... 370/406
6,480,955 B1 11/2002 DeKoning et al.
6,574,197 B1 * 6/2003 Kanamaru et al. ..... 370/252
6,584,502 B1 * 6/2003 Natarajan et al. ..... 709/224
6,591,373 B1 7/2003 Ardis et al.
6,609,195 B2 * 8/2003 Dover
6,751,753 B2 6/2004 Nguyen et al.
6,765,864 B1 * 7/2004 Natarajan et al. ..... 370/224
6,816,896 B2 11/2004 Fortin et al.
6,917,979 B1 * 7/2005 Dutra et al. ..... 709/229
6,966,015 B2 11/2005 Steinberg et al.
6,976,065 B2 12/2005 Kaiser et al.
7,003,569 B2 * 2/2006 Garg et al. ..... 709/225
7,046,263 B1 * 5/2006 Abbott et al. ..... 715/740
7,149,725 B2 * 12/2006 Morciniec et al. ..... 705/80
7,178,065 B2 * 2/2007 Dinker et al. ..... 714/41
2002/0013711 A1 * 1/2002 Ahuja et al. ..... 705/1
2002/0026605 A1 * 2/2002 Terry
2002/0120724 A1 8/2002 Kaiser et al. ..... 709/221
2002/0120886 A1 8/2002 Nguyen et al. ..... 714/39
2002/0170002 A1 11/2002 Steinberg et al. ..... 714/39
2003/0014491 A1 * 1/2003 Horvitz et al. ..... 709/206
2003/0120760 A1 * 6/2003 Fortin et al. ..... 709/221
2003/0126422 A1 7/2003 Dover ..... 713/1
2003/0212646 A1 * 11/2003 Horvitz ..... 706/46
2004/0153869 A1 * 8/2004 Marinelli et al. ..... 714/47
2006/0015609 A1 * 1/2006 Hagale et al. ..... 709/224
2007/0011314 A1 * 1/2007 Horvitz et al. ..... 709/224
2007/0174448 A1 * 7/2007 Ahuja et al. ..... 709/224
2008/0186529 A1 * 8/2008 Carney et al. ..... 358/1.15

* cited by examiner

*Primary Examiner*—Christopher S McCarthy

(57) ABSTRACT

System and method for managing and communicating state changes of a complex system. The system includes a plurality of configuration items, wherein each configuration item is a functional component of the system and has an associated state value that is one of a set of state values describing operational characteristics of the configuration item. A data structure that represents transitions between the state values is constructed in each of the configuration items. Each of the configuration items receives notification requests that include a first set of state values, a second set of state values, a requester identifier, and a message value. The requester identifier and message value of each notification request are associated with a transition of the configuration item for a transition from a state in the first set of state values to a state value in the second set of state values. In response to a transition of a configuration item between state values, a message value(s) and requester identifier(s) that are associated with the transition are selected, and the message value(s) is sent to the requester(s) referenced by the requester identifier(s).

39 Claims, 9 Drawing Sheets

SYSTEM AND METHOD FOR MANAGING AND COMMUNICATING STATE CHANGES OF A COMPLEX SYSTEM

Matter enclosed in heavy brackets [ ] appears in the original patent but forms no part of this reissue specification; matter printed in italics indicates the additions made by reissue.

*The instant application is a reissue of U.S. Pat. No. 6,832,346, which was filed as U.S. application Ser. No. 09/834,393 on Apr. 13, 2001.*

FIELD OF THE INVENTION

The present invention generally relates to monitoring the operating state of a complex electronic system.

BACKGROUND

Monitoring the operational state of electronic systems is commonly performed to detect problems, take precautionary measures before problems occur, or inform users, for example. Systems that include many distributed components present unique challenges for managing the operational state of the system and the various components. Example operational states include starting up, standby, shutting down, and other states governed by the particular system. Based on transitions among the operational states, the system may take various actions. For example, the system may perform various automated actions, alert an operator for manual intervention, or generate informational messages.

For large systems that include many components, managing the state-related interactions between components and monitoring the states of all the components can be complicated. For example, in a system having a large number of components, the number of different combinations of states of the different components can be very large, thereby complicating monitoring the different states. In addition, the system may be comprised of a hierarchy of constituent components. The constituent components may need to respond to state changes in other components at various levels in the hierarchy.

In addition, the system may be geographically dispersed. In this case it may be important to minimize that amount of data traffic among components required to satisfy the monitoring requirements.

Thus, an arrangement that supports monitoring the system state, the states of the individual ones of the constituent components, as well as inter-component state monitoring tends to be complex.

A system and a method that addresses the aforementioned problems, as well as other related problems, are therefore desirable.

SUMMARY OF THE INVENTION

In various embodiments, the invention provides a system and method for managing and communicating state changes of a complex system. The system includes a plurality of configuration items, wherein each configuration item is a functional component of the system and has an associated state value that is one of a set of state values describing operational characteristics of the configuration item. A data structure that represents transitions between the state values is constructed in each of the configuration items. Each of the configuration items receives notification requests that include a first set of state values, a second set of state values, a requester identifier, and a message value. The requester identifier and message value of each notification request are associated with a transition in the data structure of the configuration item from a state in the first set of state values to a state value in the second set of state values. In response to such a transition of a configuration item between state values, a message value(s) and requester identifier(s) that are associated with the transition are selected, and the message value(s) is sent to the requester(s) referenced by the requester identifier(s).

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention provides a method and system for monitoring the operational state of a complex system as defined by the constituent states of the elements comprising the system. The system operates efficiently for large complex systems and is suitable for systems in which the elements are geographically dispersed.

Figure 1:
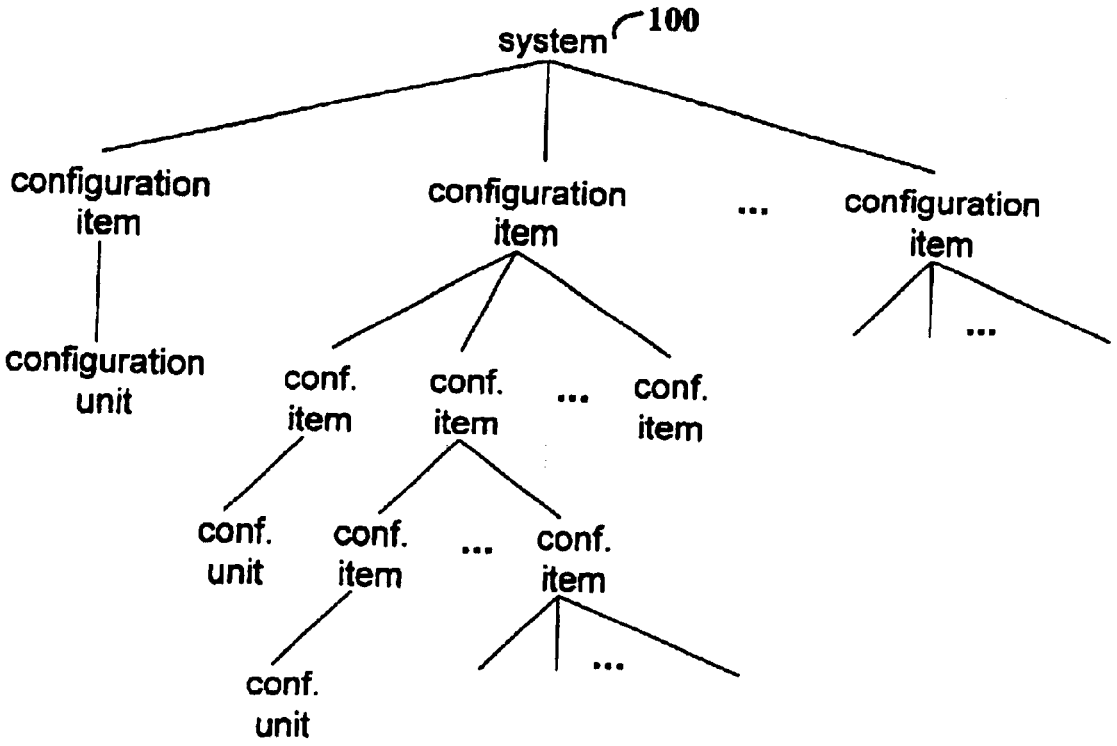
FIG. 1 is a diagram of an example system hierarchy.

FIG. 1 is a diagram of an example system hierarchy. System 100 is comprised of multiple configuration items. A configuration item is either comprised of a set of configuration items or it is a configuration unit. The configuration units are the indivisible functional elements comprising the system, and the collection of the respective states of the configuration items constitutes the system state.

Each configuration item has associated therewith a non-empty, finite set of values, or states. Every state is associated with one configuration item. The invention assumes that for the purpose of state monitoring, a state change is possible in each of the configuration items. A state change may be in response to an external (relative to the system) or an internal signal. For example, state changes may occur in response to user commands or control settings or in response to systemprogrammed resource monitors. In the examples presented herein, the states are represented as uppercase letters. The particular representation of a state in a system depends on system requirements and may include, for example, numerical values or sequences of codes.

Figure 2:
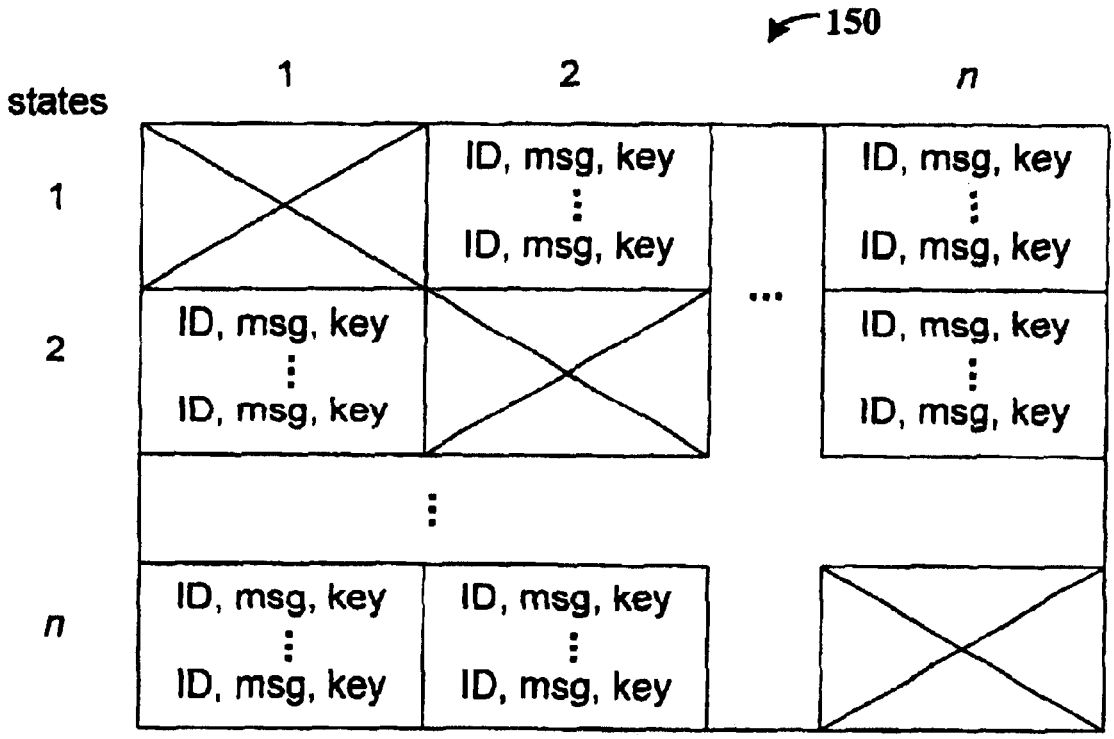
FIG. 2 shows the format of a registration table that is maintained by a configuration item in accordance with one embodiment of the invention.

FIG. 2 shows the formal of a registration table that is maintained by a configuration item in accordance with one embodiment of the invention. A configuration item receives and stores requests for notifications of changes in state for that configuration item. The registration is accomplished by sending to the configuration item a notification request that includes a pre-condition, a post-condition, a requester identifier, and a message.

The pre-condition and post-condition are sets of states of the configuration item. If the configuration item changes from a state in the pre-condition to a state in the post-condition, then the message in the notification request is sent to the requester identified by the requester identifier. Upon registration, the configuration item generates and returns a key to the requester. The key can be used to cancel the registration.

Each configuration item maintains an n by n table to track registrations for state changes of that configuration item, where n is the number of possible states of the configuration item. The rows of the table 150 represent states from which the configuration item transitions, and the columns of the table represent the states to which the configuration item transitions. Each cell in the table contains a list of triples, and each triple includes a requester identifier, a message, and a registration key. The lists of triples supports multiple registrations for a single state change.

Where a system is comprised of multiple configuration items, a mode of the system is defined to be a selected Boolean function of the state of the constituent configuration items. The system is in a mode when the function evaluates to true and enters a mode when the value of the function changes from false to true. The notation, CI(A, B, C) denotes the predicate that configuration item, CI, is in one of the states A, B, or C. If a system includes three configuration items, CI1, CI2, and CI3 where CI1 has states A, B, and C; CI2 has states M and N, and CI3 has states X, Y, and Z; then an example mode is:

CI1 (B) and (not CI2 (M) or CI3 (X, Y))

This example mode is referred to as ExampleMode from this point forward. If the function evaluates to true, then the system in ExampleMode.

Figure 8A:
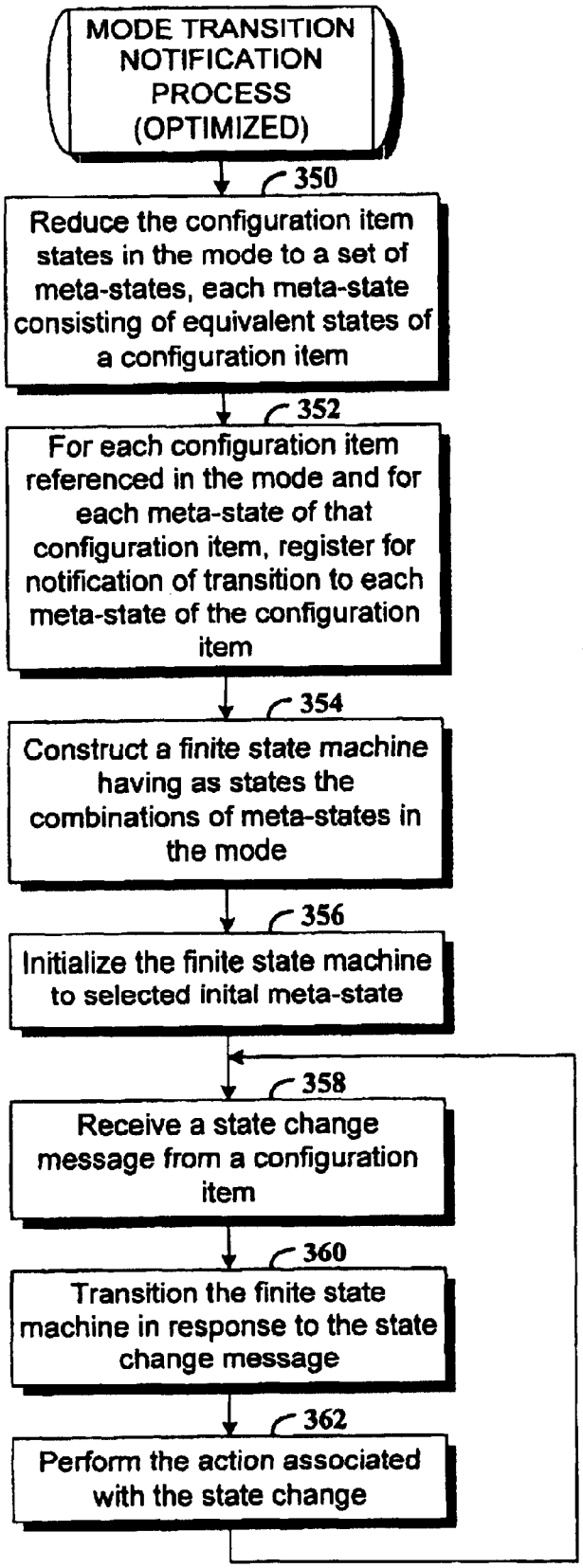
FIG. 8A is a flowchart of a process for mode transition notification which has been optimized to reduce the number of state change notifications from the configuration items.
Figure 8B:
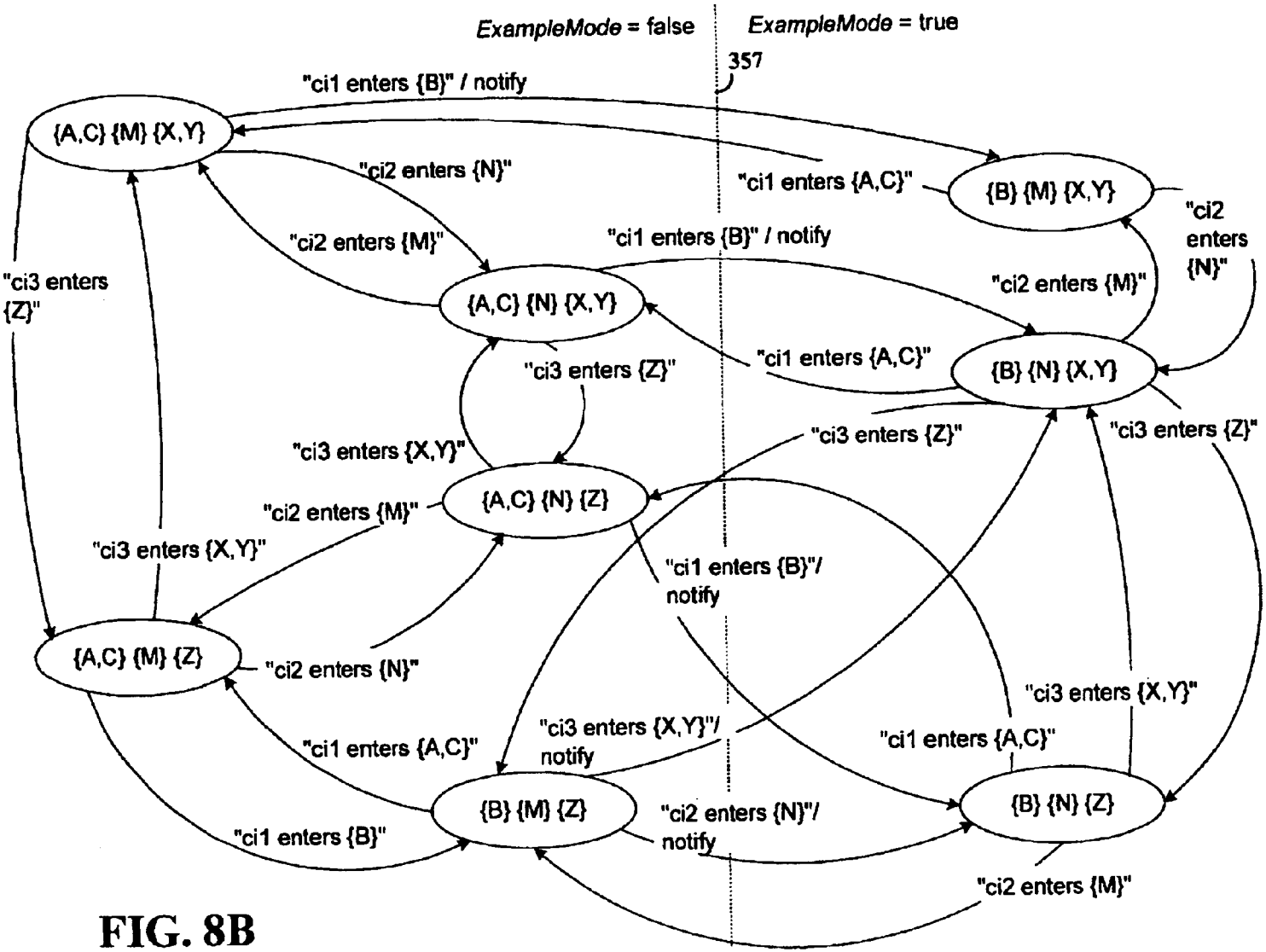
FIG. 8B is a state diagram of all the meta-state transitions for the mode ExampleMode.

In another embodiment of the invention, the states in the registration table are consolidated in accordance with a system-defined mode to reduce the message traffic in reporting state changes of configuration items. FIGS. 8A and 8B provide further details on the "optimized" embodiment of the invention.

Figure 3:
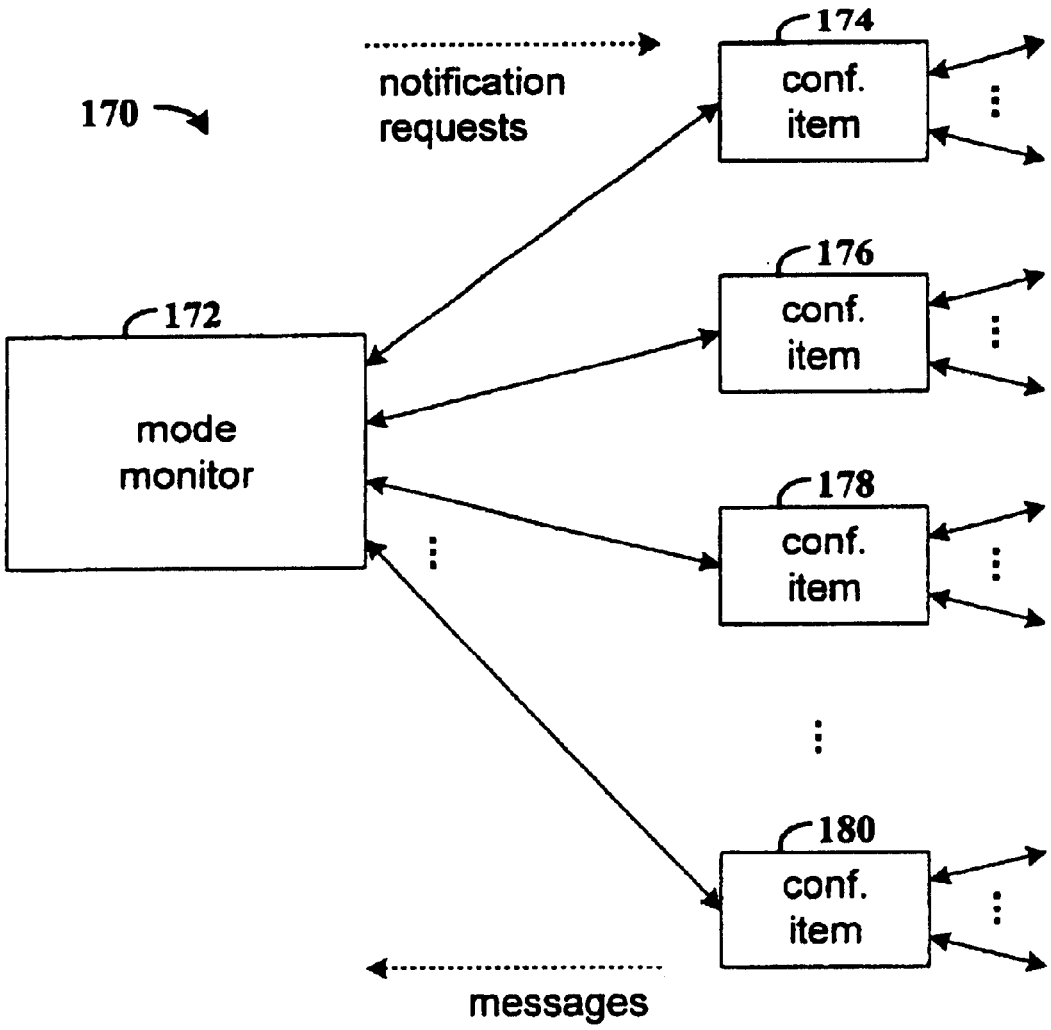
FIG. 3 is a functional block diagram of a system that includes a mode monitor for detecting mode changes in the system.

FIG. 3 is a functional block diagram of a system 170 that includes a state monitor for detecting mode changes in the system. System 170 includes a mode monitor 172 for monitoring and reacting to changes in mode. The mode monitor implements one or more functions that define modes of the system. For example, one mode is the ExampleMode defined above. To monitor the system, the mode monitor registers with selected configuration items 172, 174, 176, and 180 to receive notifications of state changes. The notifications of state changes are represented by the messages defined in the registration tables of selected configuration items.

In an example embodiment, mode monitor 172 and configuration items 174, 176, 178, and 180 are implemented as computer processes, for example, executing on one or more nodes on a network. It will be appreciated that each of configuration items 174, 176, 178, and 180 may in turn be coupled to other configuration items depending on the particular application.

Figure 4:
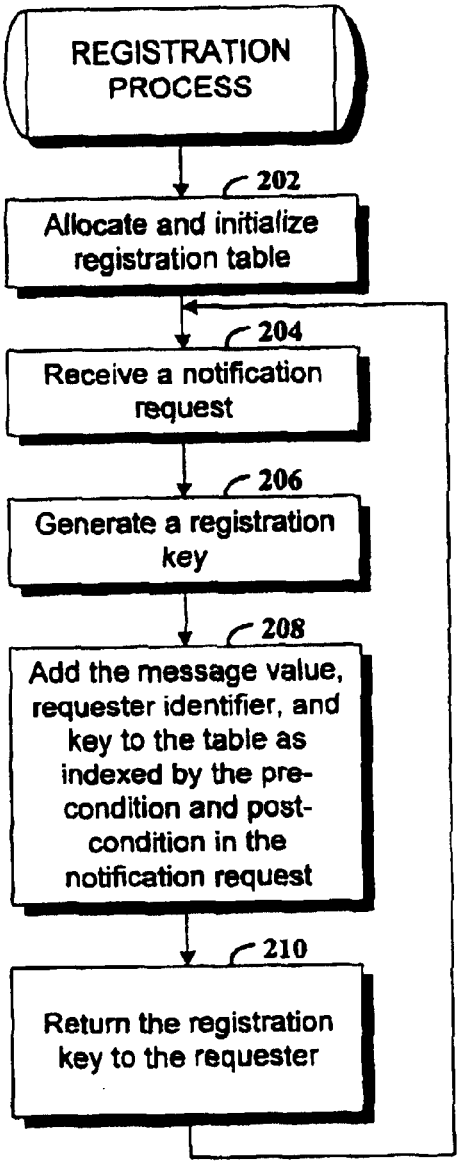
FIG. 4 is a flowchart of a process for registering notification requests with a configuration item.

FIG. 4 is a flowchart of a process for registering notification requests with a configuration item. Each configuration item in the system implements a registration process so that other configuration items or a mode monitor can register to receive notifications of state changes.

At step 202, memory is allocated for a registration table 150, and the entries in the table are initialized to null values. A notification request is received at step 204. As described above, a notification request includes a pre-condition, a post-condition, requester identifier, and a message value. Step 206 generates a unique registration key that is associated with the notification request and returned to the requester. The registration key allows the requester to cancel the registration at a later time.

At step 208, the triple consisting of the requester identifier, message value, and key is added to selected entries in the registration table 150. The entries are selected according to the pre-condition and post-condition in the notification request. In one embodiment, the row indices of the registration table represent the states from which the configuration item may transition, and the column indices represent the states to which the configuration may transition. Thus, for each state, $s_i$, in the pre-condition set and each state, $s_j$, in the post-condition set, the triple is added to the entries in the registration table as indexed by i and j.

At step 210, the registration key is returned to the requester, and the process returns to step 204 to receive and process another notification request. It will be appreciated that, depending on system requirements, the registration process may be either limited to an initialization phase of system operation or active while the system is operational.

Figure 5:
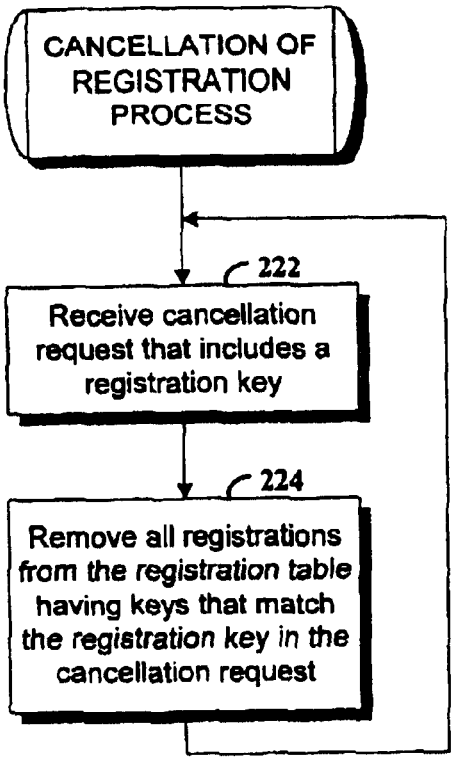
FIG. 5 is a flowchart of a process for canceling a notification registration by a configuration item.

FIG. 5 is a flowchart of a process for canceling a notification registration by a configuration item. As described above, the registration process generates a unique registration key for each notification request and returns the registration keys to the requesters. At step 222, a configuration item receives a cancellation request from a requester, for example, either a mode monitor or another configuration item. The cancellation request includes a registration key. At step 224, the configuration item removes from the table all triples having registration keys that match the registration key in the cancellation request. The process then returns to step 222 to process subsequent cancellation requests.

Figure 6:
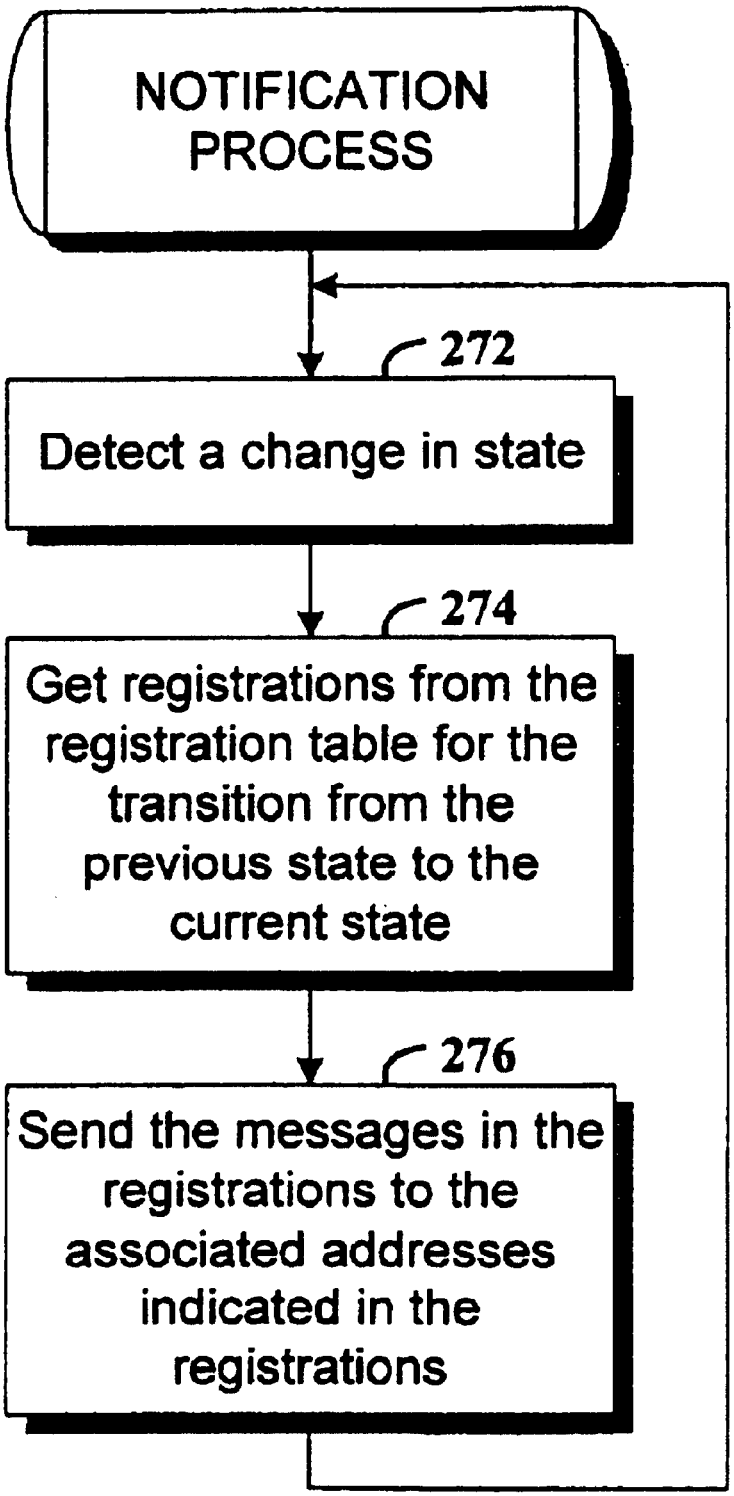
FIG. 6 is a process for notifying registrants of changes in state of a configuration item.

FIG. 6 is a process for notifying registrants of changes in state of a configuration item. Upon detecting a change in state at step 272, the configuration item at step 274 selects and reads registrations ("triples") from the registration table. The selected registrations are those in the entry indexed by the previous state and the current state. At step 276, the registrations in the selected entry are used to send messages to the registrants. The requester identifier in each registration specifies the registrant, and the message part of the registration is the code or sequence of bytes sent to the registrant. When the registrants have been notified of the state change, the process returns to step 272 to wait for the next change in state.

The techniques described above for managing state changes of configuration items of a system can be used at a system level for system-level mode monitoring. By using modes to detect and react to the operational state of a system, the system mode monitor can be configured to register with selected configuration items in order to detect mode changes. As explained above, a mode is a Boolean function of selected states of selected ones of the configuration items. The mode monitor registers with each configuration item in the mode and in response to notifications of state changes, evaluates the mode to determine a suitable action.

A system may have defined different modes for different scenarios. For example, the system may have a need to react to entry into a mode; that is, when the value of the Boolean function changes from false to true in response to a change in state of one of the configuration items. In another scenario, the system may have a need to react to exit from a mode (mode value changes from true to false). In still another scenario, the system may need to react to a transition between modes; that is, when the value of a first mode changes from true to false, and the value of a second mode changes from false to true. In one embodiment, the mode transitions are represented as a state machine.

Figure 7A:
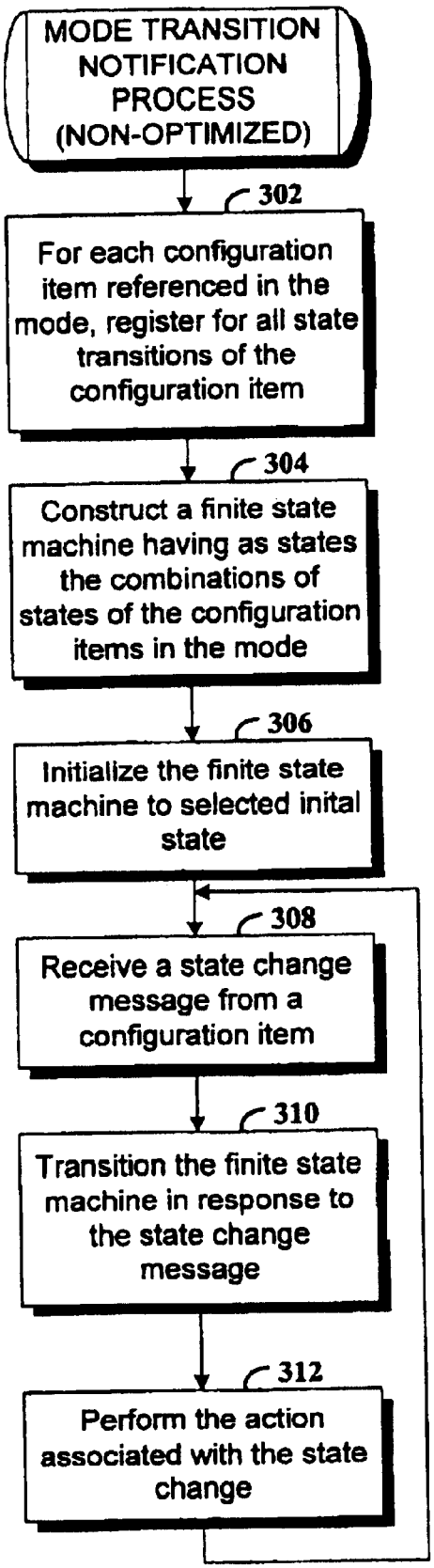
FIG. 7A is a flowchart of a process for notification of a mode transition of a system, according to one embodiment of the invention.

FIG. 7A is a flowchart of a process for notification of a mode transition of a system, according to one embodiment of the invention. FIG. 8A is an alternative embodiment in which the process has been optimized. Continuing now with FIG. 7A, at step 302, the mode monitor registers with each configuration item in the mode for notification of state changes of the configuration item. For example, in the mode, ExampleMode, configuration item CI1 that contributes to the mode has three states, A, B, and C. Table 1 below illustrates how the mode monitor would register with CI1.

TABLE 1

| Pre-condition | Post-condition | Message |
|---|---|---|
| not A | A | "CI1 enters A" |
| not B | B | "CI2 enters B" |
| not C | C | "CI3 enters C" |

The requester identifier of each registration references the mode monitor. The mode monitor registers with configuration items CI2 and CI3 in a similar manner.

At step 304, a finite state machine is constructed to support detection of the mode transition. The state machine includes states for the combinations of states of the configuration items in the mode and actions associated with the state transitions. For example, Table 2 below illustrates a portion of the state machine for entry into ExampleMode. The states of the system state machine are denoted as a concatenation of the states of the three configuration elements that comprise ExampleMode. For example, "ANX" denotes the state of the machine when CI1 is in state A, CI2 is in state N, and CI3 is in state X. The ExampleMode state columns in the table are included to assist in understanding the state transitions and are not part of the actual state machine.

TABLE 2

| Current state | ExampleMode in current state | Message | Next state | ExampleMode in next state | Action on transition |
|---|---|---|---|---|---|
| AMX | false | "CI1 enters B" | BMX | true | notify |
| BMX | true | "CI3 enters Y" | BMY | true | none |
| BMY | true | "CI3 enters Z" | BMZ | false | none |

The first row of the table shows that the "notify" action is performed when the state machine is in the AMX state (ExampleMode=false) and the message "CI1 enters B" is received after CI1 transitions to state B (ExampleMode=true).

Continuing now with step 306, the finite state machine is initialized to a selected state, which is dependent on the particular application. At step 308, a state change message is received from a configuration item, and the state machine is transitioned to the next state in response to the state change message at step 310. If there is any action associated with the transition, the action is performed at step 312. The process is then returned to step 308 to receive the next state change message.

Figure 7B:
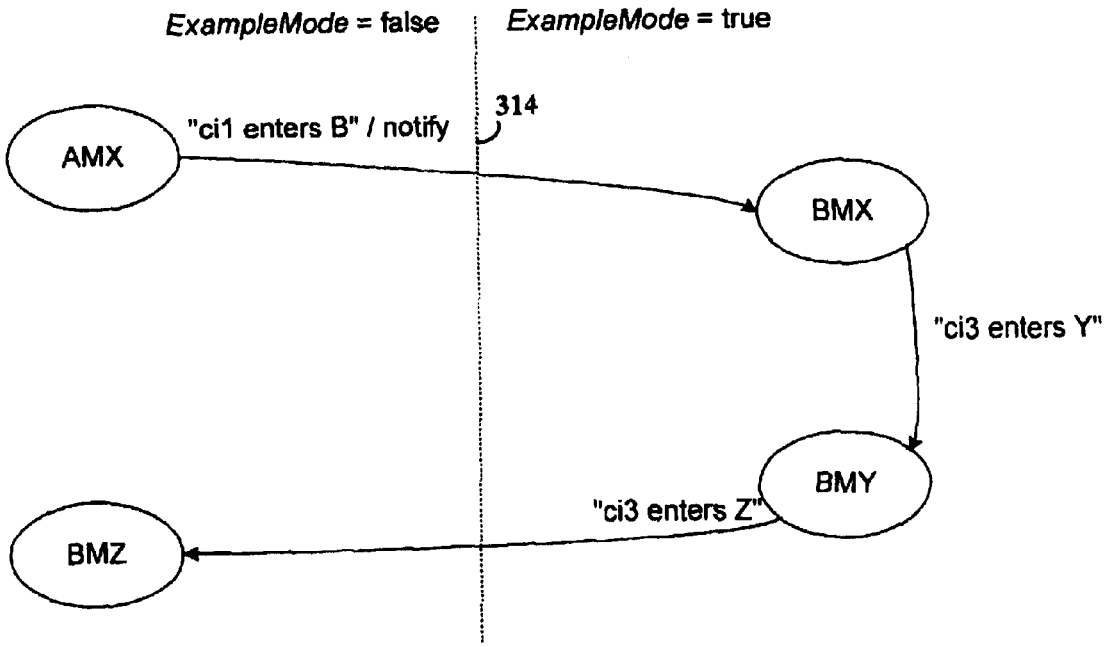
FIG. 7B depicts the state transition table of Table 2 in graphical form.

FIG. 7B depicts the state transition table of Table 2 in graphical form. Each node is labeled with a combination of state values of the configuration items CI1, CI2, and CI3, the directional lines represent a transition to the next state, and the text associated with the directional lines specifies the message that gives notice of the transition, along with any associated action. The nodes to the left of dashed line 314 correspond to ExampleMode=false, and the nodes to the right of dashed line 314 correspond to ExampleMode=true.

The mode transition notification process of FIG. 7A may result in the generation of more notification messages than is necessary to detect a mode change. For systems having many configuration items, the excess sending of notification messages may impede other functions of the system by consuming more communications bandwidth than is necessary.

FIG. 8A is a flowchart of a process for mode transition notification which has been optimized to reduce the number of state change notifications from the configuration items. The process begins by reducing the number of configuration item states in the mode to a set of meta-states. For any fixed mode, each meta-state is a set of equivalent states of a configuration item. Two states S1 and S2 of a configuration item, CIi, are equivalent for a mode if for every combination of states of the other configuration items in the system, the value of the mode is the same when CIi is in S1 as when CIi is in S2. Thus, the set of states of each configuration item can be divided into pairwise, disjoint, exhaustive subsets. The subsets are called meta-states. Table 3 below shows the meta-states of ExampleMode.

TABLE 3

| Configuration item | Meta-states |
|---|---|
| CI1 | {A, C}, {B} |
| CI2 | {M}, {N} |
| CI3 | {X, Y}, {Z} |

It will be appreciated that the mode is well-defined on meta-states. For example, ExampleMode has a well-defined value knowing only that CI1 is in meta-state{A, C} (i.e., that CI1 is in either state A or C), that CI2 is in meta-state {M}, and that CI3 is in meta-state {X, Y}.

At step 352, the mode monitor registers with each configuration item in the mode for notification of entry into each meta-state of the configuration item. Continuing with the previous example, Table 4 below illustrates the registration of the mode monitor with CI1.

TABLE 4

| Pre-condition | Post-condition | Message |
|---|---|---|
| B | A or C | "CI1 enters {A, C}" |
| not B | B | "CI1 enters {B}" |

The mode transition notification process similarly registers for meta-state change notifications with configuration items CI2 and CI3.

Table 1 illustrates the notification registrations made to configuration CI1 in the non-optimized process, and Table 4 illustrates the notification registrations made to CI1 in the optimized process (using meta-states). The reduction in the number of notification messages can be seen from the registrations listed in Tables 1 and 4. Specifically, the registrations from Table 1 show that configuration item CI1 has the potential for sending 6 notification messages: "CI1 enters A" in response to B-to-A and C-to-A transitions; "CI1 enters B" in response to A-to-B and C-to-B transitions; and "CI1 enters C" in response to A-to-C and B-to-C transitions. In contrast, the optimized version reduces the number potential notification messages to 4: "CI1 enters {A, C}" in response to B-to-A and B-to-C transitions; and "CI1 enters {B}" in response to A-to-B and C-to-B transitions.

Continuing now with the optimized mode transition notification process, at step 354 a finite state machine is constructed using the combinations of meta-states in the mode. At step 356, the state machine is initialized to a selected state that is suitable for the application. Before completing the description of the process of FIG. 8A, FIG. 8B is introduced.

FIG. 8B is a state diagram of all the meta-state transitions for the mode ExampleMode. It will be appreciated that the ExampleMode state transitions of FIG. 7B, in contrast, are only a subset of all the possible state transition in the mode. The nodes represent and are labeled with the combinations of meta-states of the configuration items, the arcs represent transitions between the nodes, and the arc labels describe the notification reported in the transition and any associated action. The nodes to the left of dashed line 357 correspond to ExampleMode=false, and the nodes to the right of dashed line 357 correspond to ExampleMode=true.

After the finite state machine is initialized, the process continues with steps 358, 360, and 362, which function similar to steps 308, 310, and 312 of FIG. 7A.

Those skilled in the art will appreciate that the example embodiments described here are suitable for applications that require actions in response to exiting a mode as well as those for transitioning between modes. The mode-exit and mode-transition applications can be implemented by constructing finite state machines consistent with the teachings set forth above.

The present invention is believed to be applicable to a variety of systems that require certain actions in response to changes in the state of the system. The invention is believed to be particularly applicable to large, complex, and geographically dispersed systems. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for managing state changes of a system that includes a plurality of configuration items, wherein each configuration item is a functional component of the system and has an associated state value that is one of a set of state values describing operational characteristics of the configuration item, comprising:

constructing a data structure in each of the configuration items representing transitions between the state values;

receiving notification requests at the configuration items, each notification request including a first set of state values, a second set of state values, a requester identifier, and a message value;

associating the requester identifier and message value of each notification request with a transition from a state in the first set of state values to a state value in the second set of state values; and in response to a transition of a configuration item between state values, selecting the message value and requester identifier associated with the transition and sending the message value to the requester referenced by the requester identifier.

2. The method of claim 1, wherein the system further includes a system monitor and the method further comprises:

defining at the system monitor a system mode as a Boolean function of one or more state values in the set of state values of one or more selected configuration items;

sending notification requests from the system monitor to each of the selected configuration items, the message value in each notification request indicating a transition to a state in the second set of state values in the notification request, and the requester identifier indicating the system monitor;

receiving message values from the selected configuration items at the system monitor; and evaluating the system mode in response to the message values.

3. The method of claim 2, further comprising:

generating a registration key for each notification request and associating each registration key with the requester identifier and message for each state transition in the notification request; and for each notification request, returning the registration key to the requester.

4. The method of claim 3, further comprising:

receiving a cancellation request at a configuration item, the cancellation request including a selected registration key; and for each state transition having an associated registration key that matches the registration key in the cancellation request, disassociating the requester identifier and message value.

5. The method of claim 2, further comprising maintaining a registration table in each of the configuration items, each entry in the registration table representing a transition from a first state to a second state and including a requester identifier, a message value, and a registration key.

6. The method of claim 1, wherein the system further includes a system monitor and the method further comprises:

defining at the system monitor a system mode as a Boolean function of one or more state values in the set of state values of one or more selected configuration items, $C_1$–$C_n$;

reducing the one or more state values to a set of meta-states, wherein each meta-state includes one or more state values associated with one of the selected configuration items, $C_1$, and the system mode is equal for every combination state values within the meta-state and state values of configuration items other than $C_1$, sending notification requests from the system monitor to each of the selected configuration items, the notification request including a first set of meta-states and a second set of meta-states, the message value in each notification request indicating a transition to a state in the second set of meta-states, and the requester identifier indicating the system monitor;

receiving message values from the selected configuration items at the system monitor; and evaluating the system mode in response to the message values.

7. The method of claim 6, further comprising:

generating a registration key for each notification request and associating each registration key with the requester identifier and message for each state transition in the notification request; and for each notification request, returning the registration key to the requester.

8. The method of claim 7, further comprising:

receiving a cancellation request at a configuration item, the cancellation request including a selected registration key; and for each state transition having an associated registration key that matches the registration key in the cancellation request, disassociating the requester identifier and message value.

9. The method of claim 6, further comprising maintaining a registration table in each of the configuration items, each entry in the registration table representing a transition from a first state to a second state and including a requester identifier, a message value, and a registration key.

10. The method of claim 1, further comprising:

generating a registration key for each notification request and associating each registration key with the requester identifier and message for each state transition in the notification request; and for each notification request, returning the registration key to the requester.

11. The method of claim 10, further comprising:

receiving a cancellation request at a configuration item, the cancellation request including a selected registration key; and for each state transition having an associated registration key that matches the registration key in the cancellation request, disassociating the requester identifier and message value.

12. The method of claim 1, further comprising maintaining a registration table in each of the configuration items, each entry in the registration table representing a transition from a first state to a second state and including a requester identifier, a message value, and a registration key.

13. An apparatus for managing state changes of a system that includes a plurality of configuration items, wherein each configuration item is a functional component of the system and has an associated state value that is one of a set of state values describing operational characteristics of the configuration item, comprising:

means for representing transitions between the state values in each of the configuration items;

means for processing notification requests at the configuration items, each notification request including a first set of state values, a second set of state values, a requester identifier, and a message value;

means for associating the requester identifier and message value of each notification request with a transition from a state in the first set of state values to a state value in the second set of state values; and means, responsive to a transition of a configuration item between state values, for selecting the message value and requester identifier associated with the transition and sending the message value to the requester referenced by the requester identifier.

14. A state management arrangement for an electronic system, comprising a plurality of configuration items, wherein each configuration item is a functional component of the system and has an associated state value that is one of a set of state values describing operational characteristics of the configuration item, each configuration item configured and arranged to receive notification requests from one or more other configuration items, each notification request including a first set of state values, a second set of state values, a requester identifier, and a message value, associate the requester identifier and message value of each notification request with a transition from a state in the first set of state values to a state value in the second set of state values, and in response to a transition of a configuration item between state values, select the message value and requester identifier associated with the transition and send the message value to the requester referenced by the requester identifier.

15. The arrangement of claim 14, further comprising a system monitor coupled to the configuration items, wherein the system monitor is configured and arranged to establish a system mode as a Boolean function of one or more state values in the set of state values of one or more selected configuration items, send notification requests to each of the selected configuration items, the message value in each notification request indicating a transition to a state in the second set of state values in the notification request, and the requester identifier indicating the system monitor, and evaluate the system mode in response to the message values received from the configuration items.

*16. An article of manufacture including a computer-readable storage medium having instructions stored thereon that, if executed by a computing device, cause the computing device to perform a method comprising:*

*receiving a notification request at the computing device, wherein the computing device is in a system, wherein the notification request includes a requester identifier and a first set of state values and a second set of state values, and wherein at least one of the first set and the second set includes two or more state values; and*

*in response to a subsequent transition of the computing device between a state corresponding to any state value in the first set and a state corresponding to any state value in the second set, sending a message to a requester corresponding to the requester identifier;*

*wherein the subsequent transition of the computing device is not caused by the receiving of the notification request.*

*17. An article of manufacture as claimed in claim 16, wherein the requester is a system monitor.*

*18. An article of manufacture as claimed in claim 17, wherein the method further comprises:*

*registering the notification request at the computing device.*

*19. An article of manufacture as claimed in claim 18, wherein the method further comprises:*

*receiving a cancellation request corresponding to the notification request; and*

*responsive to receiving the cancellation request, cancelling the registration of the notification request.*

*20. An article of manufacture as claimed in claim 17, wherein the method further comprises maintaining a registration table, one or more entries in the registration table representing a transition from a first state to a second state and including a requester identifier, a message value, or a registration key, or combinations thereof.*

*21. An article of manufacture as claimed in claim 16, wherein first and second states of the computing device correspond to first and second state values included in the first set;*

*wherein a third state of the computing device corresponds to a third state value included in the second set; and*

*wherein a value of the message sent by the computing device is the same for both (A) a transition of the computing device between the first and third states and (B) a transition of the computing device between the second and third states.*

*22. An article of manufacture as claimed in of claim 21, wherein the method further comprises: registering the notification request.*

*23. An article of manufacture as claimed in claim 22, wherein the method further comprises:*

*receiving a cancellation request corresponding to the notification request; and*

*responsive to receiving the cancellation request, cancelling the registration of the notification request.*

*24. An article of manufacture as claimed in claim 21, wherein the method further comprises maintaining a registration table, one or more entries in the registration table representing a transition from a first state to a second state and including a requester identifier, a message value, or a registration key, or combinations thereof.*

*25. An article of manufacture as claimed in claim 16, wherein both the first and second sets of state values each include two or more state values.*

*26. An article of manufacture as claimed in claim 25, wherein the method further comprises:*

*receiving a cancellation request corresponding to the notification request; and*

*responsive to receiving the cancellation request, cancelling the registration of the notification request.*

*27. An article of manufacture as claimed in claim 16, wherein the method further comprises maintaining a registration table in each of the configuration items, each entry in the registration table representing a transition from a first state to a second state and including a requester identifier, a message value, and a registration key.*

*28. A method, comprising:*

*receiving a notification request at a configuration item in a system comprising a plurality of configuration items, wherein the notification request includes a requester identifier and a first set of meta-state values and a second set of meta-state values, wherein at least one of the first set and the second set includes two or more meta-state values; and*

*in response to a subsequent transition of the configuration item between a meta-state corresponding to any meta-state value in the first set and a meta-state corresponding to any meta-state value in the second set, the configuration item sending a message to a requester corresponding to the requester identifier in the notification request;*

*wherein the subsequent transition of the configuration item is not caused by the receiving of the notification request.*

*29. The method of claim 28, wherein the requester is a system monitor.*

*30. The method of claim 29, further comprising:*

*registering the notification request at the configuration item.*

*31. The method of claim 30, further comprising:*

*the configuration item receiving a cancellation request corresponding to the notification request; and*

*responsive to receiving the cancellation request, the configuration item cancelling the registration of the notification request.*

*32. The method of claim 30, further comprising the configuration item returning a registration key to the requester.*

*33. The method of claim 32, further comprising:*

*registering the notification request at the configuration item;*

*the configuration item receiving a cancellation request corresponding to the notification request; and*

*responsive to the cancellation request, canceling the registration of the notification request at the configuration item.*

*34. The method of claim 29, further comprising maintaining a registration table in the configuration item, one or more entries in the registration table representing a transition from a first meta-state to a second meta-state and including a requester identifier, a message value, or a registration key, or combinations thereof.*

*35. The method of claim 28, further comprising the configuration item sending the notification request to the requester only when the subsequent transition is from a first meta-state to a second meta-state.*

*36. The method of claim 35, further comprising maintaining a registration table in the configuration item, one or more entries in the registration table representing a transition from a first meta-state to a second meta-state and including a requester identifier, a message value, or a registration key, or combinations thereof.*

*37. The method of claim 28, further comprising:*

*registering the notification request at the configuration item.*

*38. The method of claim 37, further comprising:*

*the configuration item receiving a cancellation request corresponding to the notification request; and*

*responsive to the cancellation request, cancelling the registration of the notification request at the configuration item.*

*39. The method of claim 28, further comprising maintaining a registration table in the configuration item, one or more entries in the registration table representing a transition from a first meta-state to a second meta-state and including a requester identifier, a message value, or a registration key, or combinations thereof.*

* * * * *

UNITED STATES PATENT AND TRADEMARK OFFICE

CERTIFICATE OF CORRECTION

PATENT NO. : RE41,991 E
APPLICATION NO. : 11/640542
DATED : December 7, 2010
INVENTOR(S) : Cross It is certified that error appears in the above-identified patent and that said Letters Patent is hereby corrected as shown below:

IN THE DRAWINGS:

Sheet 6 of 9, FIG. 7A, Line 2 (Box 306), delete "inital" and insert -- initial --.

Sheet 8 of 9, FIG. 8A, Line 2 (Box 356), delete "inital" and insert -- initial --.

IN THE SPECIFICATIONS:

Column 3, line 6, delete "formal" and insert -- format --.

Column 5, line 33, in Table 1, delete ""CI2" and insert -- "CI1 --.

Column 5, line 34, in Table 1, delete ""CI3" and insert -- "CI1 --.

IN THE CLAIMS:

Column 11, line 8, in Claim 22, delete "*in of*" and insert -- *in* --.

Signed and Sealed this
Thirtieth Day of August, 2011

David J. Kappos

David J. Kappos
*Director of the United States Patent and Trademark Office*